March 13, 1962   J. S. SZPILA   3,024,494
PLASTIC PIPE EXTRUSION HEAD
Filed July 21, 1958   2 Sheets-Sheet 1

INVENTOR
JEROME S. SZPILA
BY
ATTORNEY

March 13, 1962 J. S. SZPILA 3,024,494
PLASTIC PIPE EXTRUSION HEAD
Filed July 21, 1958 2 Sheets-Sheet 2

INVENTOR
JEROME S. SZPILA
BY
ATTORNEY

# United States Patent Office 3,024,494
Patented Mar. 13, 1962

3,024,494
PLASTIC PIPE EXTRUSION HEAD
Jerome S. Szpila, Lahaska, Pa., assignor to H. K. Porter Company Inc., a corporation of Delaware
Filed July 21, 1958, Ser. No. 750,025
8 Claims. (Cl. 18—13)

This invention relates to an improved extrusion head for making two-ply plastic pipes and tubes having plastic material of one composition defining their inner walls and of another but compatible composition defining their outer walls, the materials being integrally bonded together intermediate said inner and outer walls.

Plastic pipe is increasingly being employed for conducting drinking water and other fluids which must be kept uncontaminated and sometimes even sterile while passing therethrough and in order that such pipes may be adequately inspected visually it is advisable their inner walls be highly light reflective. It has therefore been suggested they be made of polyethylene plastic containing non-toxic white pigment but as pipe manufactured entirely from white, light colored or neutral translucent polyethylene readily succumbs to the action of ultraviolet rays when exposed to sunlight there has been developed an extrusion head capable of extruding polyethylene pipes with inner walls formed of white or light colored and outer walls of black or dark colored polyethylene, the later resistant and relatively opaque to ultraviolet radiation. This head is provided at one side with a port for reception of the material to be formed into the inner layer of the pipe and substantially diametrically opposite thereto a port for reception of that to be formed into the outer layer both of which, even when heated to plastic or semi-fluid condition, must be supplied to the head under considerable pressure. But this head is not entirely satisfactory for the reason that the inner and outer layers of the pipe produced by it are not always truly concentric as a result, it is believed, of the resolving of the said pressures against structural portions of the head while in operation inducing some temporary distortion within the elastic limits of the parts in turn causing eccentricity of the respective layers of polyethylene in the extruded pipe and circumferentially non-uniform wall thicknesses thereof.

It is therefore a principal object of this invention to provide in a plastic pipe extrusion head of the character just mentioned means for maintaining the parts in precise predetermined alignment to compensate for the tendency of the plastic materials extruded therethrough under pressure to issue from the annular head ports in a circumferentially non-uniform manner.

A further object is to provide in such extrusion head means for maintaining the parts in precise predetermined alignment to compensate for any distortion resulting from the pressures to which the parts are subjected in use and also to minimize occurrence of such distortion.

A further object is to provide in an extrusion head adapted for production of double-wall plastic pipe adjustable means for inhibiting eccentricity of the tubular layers formed by the respective extrusion ports whereby the inner and outer wall surfaces of the extruded pipe as well as the meeting surface between its layers may be made precisely concentric.

Other objects, purposes and advantages of the invention will hereinafter more fully appear or will be understood from the following description of an embodiment of it illustrated in the accompanying drawings in which.

Figure 1:
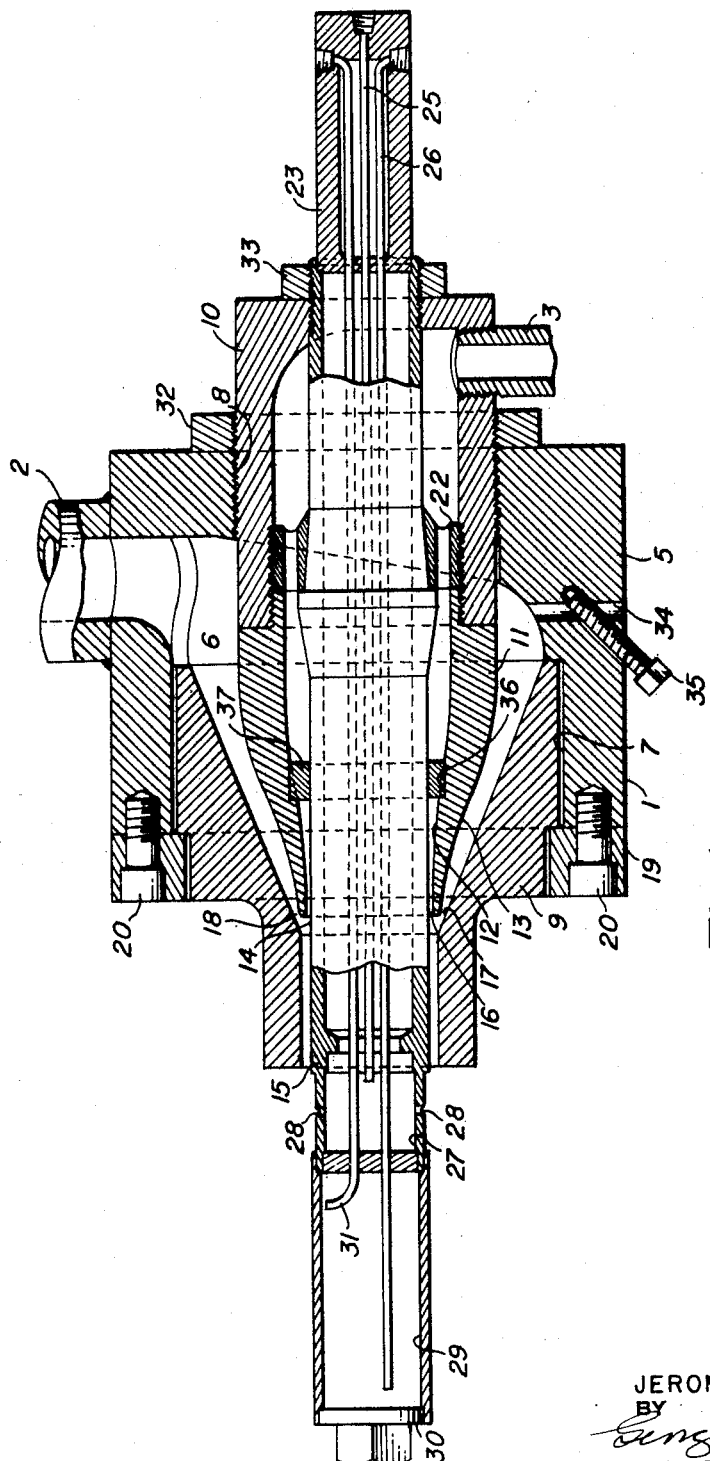
FIG. 1 is a horizontal axial section of an extrusion head embodying my invention.
Figure 2:
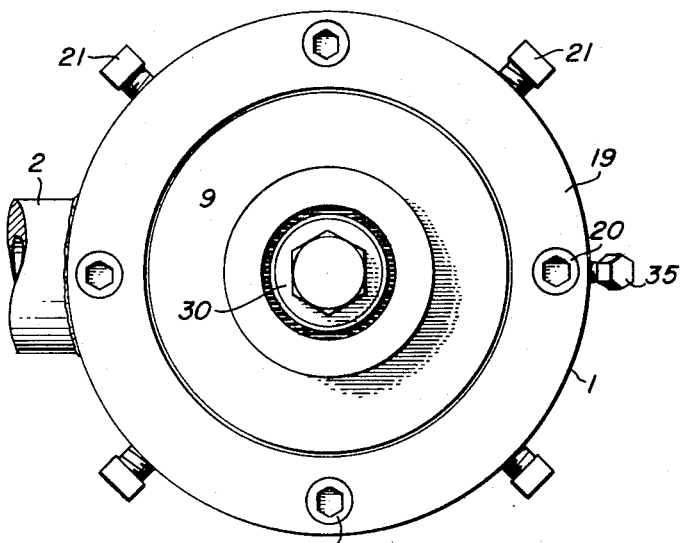
FIG. 2 is an elevation of the exit end of the head.

Referring now more particularly to the drawings, the head 1 illustrated therein is designed for installation in apparatus (not shown) of well known character comprising units respectively designed for feeding continuously from hoppers comminuted plastic materials under considerable pressure and usually at an elevated temperature; as illustrated the head comprises a duct 2 for connection to one of such units and a duct 3 for connection to the other.

The head itself comprises a main housing 5 having an inner chamber 6 into which duct 2 discharges and cylindrical end surfaces 7, 8, the latter being threaded, respectively receiving an outer die member 9 and an externally threaded inner-die-member-and-mandrel support 10. The inner die member 11 threaded into one end of the latter comprises inner and outer concentric substantially frusto conical die surfaces 12, 13, the former cooperating with the outer surface 14 of a mandrel 15 to define an annular inner extrusion port 16 and the latter with the inner surface 17 of outer die member 9 to define an annular outer port 18. The die member 9 is secured to the housing by a ring 19 and cap screws 20 and is laterally adjustable therein by operation of radially extending adjusting screws 21.

Disposed generally axially in the head and supported primarily from the mandrel support 10 by means of a spider 22 and a threaded connection therewith at its rear end (to the right in FIG. 1), mandrel 15 is connected through an extension 23 with air supply and coolant circulating systems (not shown) which deliver air and water respectively to air pipe 25 and water pipe 26, the former extending to a chamber 27 having ports 28 the purpose of which will hereafter appear while the water pipe 26 discharges into a chamber 29 closed at the mandrel end by a cap 30, the coolant being discharged from this chamber through a waste pipe 31.

As shown in FIG. 1 the inner-die-and-mandrel support 10 is locked in housing 5 by a lock nut 32 while the mandrel in turn is locked in support 10 by a lock nut 33, housing 5 being provided with a bleeder passage 34 controlled by an adjusting screw 35.

As thus far described this head is in many respects similar to one disclosed in United States Letters Patent 2,574,555 to Frederick M. Galloway except in that in the present head the plastic materials for both layers of the extruded product are fed radially into the head but it has been found that, probably due to stresses resulting from the pressures involved when the projecting end of the inner die member is assembled exactly coaxially with the mandrel and the outer die member adjusted to precise coaxial relation with both, the wall thickness of the respective layers in the extruded pipe tends to be non-uniform and the layers themselves become mutually non-concentric. It is believed this may result from a slight yielding by inner die member 11 in a direction away from input duct 2 accompanied by a slight yielding by the mandrel itself in the opposite direction thus tending to widen port 18 on the side nearer duct 2 and constrict it on its opposite side while port 16 is constricted near duct 2 and widened on the opposite side.

Figure 3:
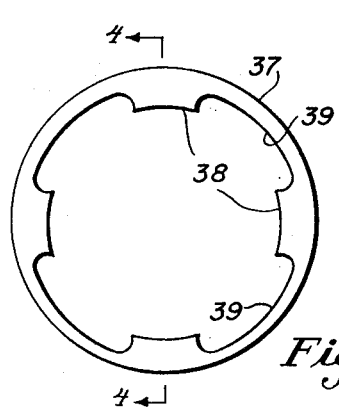
FIG. 3 is a front elevation of a spacer element removed from the head, the eccentricity of its inner and outer surfaces with respect to each other being somewhat exaggerated for clearness of illustration in this and the succeeding figure.
Figure 4:
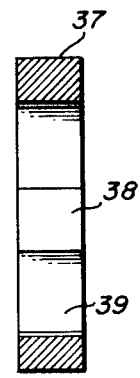
FIG. 4 is a section on line 4—4 in FIG. 3.
Figure 5:
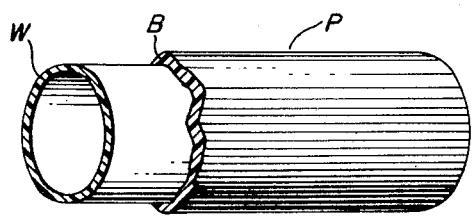
FIG. 5 is a fragmentary perspective of a plastic pipe made with the aid of the head illustrated in the foregoing figures.

To prevent this result, yet without providing end supports which would interrupt circumferential uniformity of the extruded pipe there is provided in the interior of inner die member 11 a circumferential groove 36 in which is snugly seated an adjusting collar 37 illustrated apart from the head in FIGS. 3 and 4. This collar is substantially cylindrical in external contour and complements groove 36 when seated therein; interiorly it presents a plurality of lands 38, preferably four, separated by longitudinal grooves 39. Lands 38 are described by the same radius of curvature as mandrel 15 at the zone at which the collar and mandrel are in registry but the lands are eccentric with respect to the external cylindrical surface of the collar by a few thousandths of an inch (exaggerated in FIGS. 3 and 4) whereby when the collar is assembled with the mandrel and seated in groove 36 it holds the mandrel correspondingly eccentric with respect to inner surface 12 of the inner die member. As has been mentioned, it is usually advisable to compensate for the effects of internal stresses by positioning the mandrel slightly farther away from the die member in the direction of duct 2 than in that of duct 3 and this is accomplished by disposing the collar rotatively on the mandrel in the position in which its greatest thickness radially is in the zone or sector nearest duct 2 in a head of the character illustrated, although in other heads the zone of compensation may be different and the collar will then require a different rotative adjustment on the mandrel. It will of course be evident the outer die member may be adjusted at will to insure concentricity of the outer surface of the extruded pipe and circumferential uniformity of its outer plastic layer.

The head just described is designed to be assembled in an extruder having means for delivering plastic materials respectively to ducts 2, 3 under suitable pressure and usually at elevated temperature which may be maintained by installing supplementary external heating coils (not shown) at appropriate positions on the head, the parts of the head being assembled as indicated in FIG. black polyethylene plastic B being supplied through duct 2 and white material W of similar or at least compatible composition through duct 3 when white-lined black plastic pipe P is to be made.

Normally air under positive pressure of a few inches of water is supplied through pipe 25 to ports 28 and water or other coolant is admitted through pipe 26 to chamber 29 for circulation therein and discharge to waste through pipe 31. Preferably the outer diameter of the casing forming chamber 29 is slightly less than that of the adjacent end of mandrel 15 while that of the casing forming chamber 27 is smaller than that of either. Consequently when the double wall tube of hot and hence soft material is formed by extrusion at ports 16, 18 and moves along the mandrel to and beyond its end, it is prevented from collapsing by the positive internal air pressure maintained in it through ports 28 and immediately thereafter its cooling to restore its normal relative rigidity is initiated on its passage close to but not in embracing relation with the chamber 29 casing, the smaller diameter of the latter allowing the pipe to pass readily beyond it without physical injury. It will be appreciated that while partially cooled internally by its passage through the zone of influence of chamber 29 it is still sensitive externally to physical injury due to its elevated temperature and is therefore preferably passed continuously through a cooling bath before being cut into lengths for use or sale.

When polyethylene plastic is fed into the head in the manner and for the purposes described it completely fills the chambers in the head, and being in a semi-fluid condition due to heating, normally arrives at the respective extrusion ports under pressures which are substantially uniform circumferentially of the ports. It is usually desirable, however, that adjusting screw 35 controlling bleeder passage 34 opposite duct 2 be set to allow the escape for re-use of a minor portion of the plastic admitted through said duct whereby pressure uniformity circumferentially of port 18 may be enhanced.

It will be understood it has herein been assumed eccentricity of the pipe layers produced by the head in the absence of collar 37 is due to physical distortion of internal parts under the pressure of the plastics exerted against them. It is not, however, inconceivable this result may be abetted by the minimum pressure losses due to friction along the shortest paths from duct to port as compared with those along the longest ones, but as eccentricity due to such cause is of the same order and in the same direction as that due to distortion, its effects are counteracted by the collar in the same manner as the effects of the latter.

While I have herein shown and described with considerable particularity one embodiment of the invention it will be understood I do not desire or intend to be limited or confined thereto or thereby in any way, as changes and modifications in the form, structure, arrangement and relationship of the several parts of the apparatus will readily occur to those skilled in the art and may be effectuated if desired without departing from the spirit and scope of the invention as defined in the appended claims.

Having thus described my invention, I claim and desire to protect by Letters Patent of the United States:

1. In combination with an extrusion head comprising a housing defining a chamber, means providing a hollow frusto conical inner surface within the chamber, a generally cylindrical mandrel disposed in substantially coaxial relation with said means and said housing, means presenting substantially frusto conical inner and outer surfaces interposed between the mandrel and said first means and defining respectively therewith substantially coplanar inner and outer generally annular extrusion ports and means for delivering plastic material under pressure respectively to said ports, a collar having a cylindrical outer surface disposed adjacent said ports in a complementary groove in the inner surface of said second means axially remote from the plane of said ports and circumferentially aligned parti-cylindrical inner surfaces coaxial with the mandrel and engaging the surface thereof in eccentric relation to said outer cylindrical surface, to thereby correspondingly maintain the inner edge of said inner extrusion port eccentric with respect to its outer edge.

2. The combination defined in claim 1 in which the collar comprises circumferentially spaced lands alternating with axially extending grooves forming with the mandrel passages for conducting the plastic material to said inner extrusion port in parallelism with the mandrel axis.

3. The combination defined in claim 1 in which the groove receiving the collar is coaxial with the outer edge of said inner extrusion port and the inner edge of said port is defined by the mandrel and is eccentric with relation to said groove.

4. The combination defined in claim 1 in which the collar is operative to maintain the mandrel in non-concentric relation to the groove and thereby compensate for elastic distortion of the mandrel under pressure of plastic material introduced into the head.

5. In an extrusion head for forming two-layer plastic hose, a cylindrical mandrel, an inner die member surrounding and spaced from the mandrel, means supporting said member at one end, and means interposed between the mandrel and the die member remote from the free end of the latter operative to maintain said free end in eccentric relation to the mandrel whereby to define between the mandrel and said end a port the outer and inner bounding surfaces of which are in non-concentric relation.

6. The combination defined in claim 5 in which the means interposed between the mandrel and the die member comprise a collar seating in the die member having a cylindrical outer surface engaging therewith and an inner surface eccentric thereto bearing on the mandrel.

7. The combination defined in claim 6 in which the collar is rotatably adjustable in the die member and its inner surface is longitudinally grooved to define a plurality of circumferentially spaced lands bearing on the mandrel, the grooves forming passages adapted to conduct plastic material to said port.

8. An extrusion head comprising a substantially cylindrical mandrel, a die element defining therewith an annular extrusion orifice, and a collar for eccentrically positioning the mandrel in the head comprising a body having a cylindrical outer surface adapted for reception in a complementary cavity in the head, concave arcuate circumferentially spaced coaxial lands disposed inwardly from said surface having common radii substantially coextensive with the mandrel radius and eccentric with respect to said surface engaging said mandrel axially remote from the said orifice, and grooves interposed between adjacent lands extending substantially parallel with the axis of the latter adapted when the collar is disposed on the mandrel with said lands in engagement with its surface to define therewith passages for conducting plastic material longitudinally of the mandrel toward said orifice.

References Cited in the file of this patent

UNITED STATES PATENTS

| | | |
|---|---|---|
| 579,938 | Cushman | Mar. 30, 1897 |
| 1,100,002 | Van Ness | June 16, 1914 |
| 2,574,555 | Galloway | Nov. 13, 1951 |
| 2,633,602 | Sverdrup | Apr. 7, 1953 |
| 2,708,772 | Moncrieff | May 24, 1955 |
| 2,720,680 | Gerow | Oct. 18, 1955 |
| 2,805,446 | Bartoo | Sept. 10, 1957 |

FOREIGN PATENTS

| | | |
|---|---|---|
| 687,937 | Great Britain | Feb. 25, 1953 |